United States Patent
Fukutani et al.

(10) Patent No.: US 6,852,431 B2
(45) Date of Patent: Feb. 8, 2005

(54) MAGNETIC RECORDING MEDIA AND METHOD FOR MANUFACTURING THE SAME

(75) Inventors: Kazuhiko Fukutani, Kanagawa (JP); Toru Den, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/271,472

(22) Filed: Oct. 15, 2002

(65) Prior Publication Data

US 2003/0072971 A1 Apr. 17, 2003

(30) Foreign Application Priority Data

Oct. 16, 2001 (JP) ........................................ 2001-317682

(51) Int. Cl.[7] .............................. G11B 5/66; G11B 5/70
(52) U.S. Cl. ............... 428/694 R; 428/693; 428/694 T; 428/694 TS; 428/900
(58) Field of Search ..................... 428/694 SG, 694 ST, 428/900, 694 R, 693, 694 T, 694 TS

(56) References Cited

U.S. PATENT DOCUMENTS 6,420,058 B1 * 7/2002 Haratani et al. ......... 428/694 T

2002/0031008 A1   3/2002 Den et al. .................... 365/173
2002/0086185 A1   7/2002 Yasui et al. ............ 428/694 TS

OTHER PUBLICATIONS

A. Abe et al., "Forming Mosaic Structures in Anodized Porous Alumina", Jap. Soc. Appld. Phys. and Related Soc., Extended Abstracts (48th Spring Meeting 2001), No. 3, p. 1322.

* cited by examiner

Primary Examiner—Holly Rickman
(74) Attorney, Agent, or Firm—Fitzpatrick, Cella, Harper & Scinto

(57) ABSTRACT

A magnetic recording medium includes data signal storage regions each having first magnetic substance cells, and tracking servo signal storage regions each having second magnetic substance cells. The first magnetic substance cells are separated from one another by nonmagnetic substance and the second magnetic substance cells are separated from one another by nonmagnetic substance, and the first magnetic substance cells and the second magnetic substance cells have different magnetic properties.

23 Claims, 11 Drawing Sheets

1056 Magnetic Substance Cell

1058 Magnetic Substance Cell

1057 Magnetic Substance Cell

MAGNETIC RECORDING MEDIA AND METHOD FOR MANUFACTURING THE SAME

FIELD OF THE INVENTION

The present invention relates to magnetic recording media that can record and read information and a method for manufacturing the same.

RELATED BACKGROUND ART

With a rapid increase in the amount of information in recent years, there have been demands for considerably larger capacity in information recording devices such as magnetic recording devices. Under the circumstances, hard disk drives (HDD) have always been used as information recording devices in computers due to their overwhelmingly low bit-unit price and high data transfer speed compared to other recording methods.

In recent years, the recording density of hard disks have been achieving an incredible 100% annual increase, and it has been reported that 100 $Gb/in^2$ (15.5 $Gb/cm^2$) was recorded recently on an experimental level.

However, in spite of such circumstances, an even higher density is demanded of hard disk drives' recording density.

Magnetic recording media that are used in hard disk drives generally are disk-shaped, where ring-shaped regions are called tracks. Each track is segmented by a plurality of regions which record tracking servo signals (hereinafter called "tracking servo signal storage regions"). Within a track, regions that are divided by the tracking servo signal storage regions become regions for data signals (hereinafter called "data signal storage regions").

The movement of a magnetic head for writing or reading data operates as follows: the magnetic head reads servo signals that are recorded in one of the tracking servo signal storage regions, a head actuator is controlled based on the signal, and the magnetic head is moved to a target position.

To record tracking servo signals on a recording medium, a servo writer device is generally used to write tracking servo signals on the recording medium after making the magnetic recording medium.

However, as track width is decreased to increase track density (recording density), advanced control of signal write position becomes required; consequently, the servo writer device must have a mechanism to accurately position itself, which increases the price of the server writer device.

Furthermore, since signals must be written in numerous tracks due to higher track density, more time is required to write tracking servo signals, which increases manufacturing costs.

The reason for having to form tracking servo signal storage regions using a servo writer device that has advanced positioning control after making a magnetic recording medium is that magnetic properties of the data signal storage regions and of the tracking servo signal storage regions are the same.

SUMMARY OF THE INVENTION

In view of the above, the present invention relates to magnetic recording media, as well as their manufacturing methods, in which magnetic properties of cells in data signal storage regions and magnetic properties of at least part of the cells in tracking servo signal storage regions are different.

A magnetic recording medium in accordance with one aspect of the present invention comprises data signal storage regions with first magnetic substance cells and tracking servo signal storage regions with second magnetic substance cells, wherein the first magnetic substance cells and the second magnetic substance cells are separated from one another by nonmagnetic substances, and wherein the first magnetic substance cells and the second magnetic substance cells have different magnetic properties.

The tracking servo signal storage regions may contain the first magnetic substance cells.

Further, a magnetic recording medium in accordance with another aspect of the present invention pertains to a magnetic recording medium having tracking servo signal storage regions that contain first magnetic substance cells and second magnetic substance cells, wherein the first magnetic substance cells and the second magnetic substance cells are separated from one another by nonmagnetic substance, and wherein the first magnetic substance cells and the second magnetic substance cells have different magnetic properties.

Moreover, in accordance with still another aspect of the present invention, a magnetic recording medium comprises magnetic substance cells separated from one another by nonmagnetic substances, wherein the magnetic substance cells are segmented into units of minimum unit magnetic recording sections each including a specified number of the magnetic substance cells, data signal storage regions each including a plurality of the minimum unit magnetic recording sections arranged, tracking servo signal storage regions each including a plurality of the minimum unit magnetic recording sections arranged, and wherein magnetic properties of the magnetic substance cells that constitute a part or all of the minimum unit magnetic recording sections arranged in the tracking servo signal storage regions are different from magnetic properties of the magnetic substance cells that constitute the minimum unit magnetic recording sections arranged in the data signal storage regions.

In addition, in accordance with another aspect of the present invention, a method for manufacturing a magnetic recording medium comprises the steps of forming pores of a first pore size in data signal storage regions in a non-magnetic layer, forming pores of a second pore size different from the first pore size in tracking servo signal storage regions in the non-magnetic layer, selectively filing first magnetic substance in the pores at least in the data signal storage regions, and filing second magnetic substance different from the first magnetic substance in the pores in the data signal storage regions and the tracking servo signal storage regions.

Any one of the aforementioned magnetic recording media and a magnetic head for signal recording may be combined to provide a magnetic recording apparatus. Furthermore, such a magnetic recording apparatus may be implemented in an electronic apparatus such as a computer.

Other features and advantages of the present invention will be apparent from the following description taken in conjunction with accompanying drawings, in which like reference characters designate the same or similar parts throughout thereof.

DESCRIPTION OF THE PREFERRED EMBODIMENTS

First Embodiment

An embodiment of the present invention will be described with reference to FIG. 1.

Figure 1:
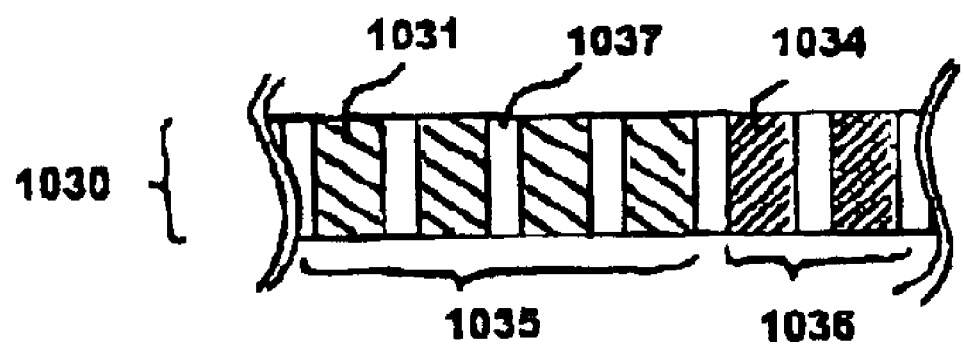
FIG. 1 shows a cross-sectional view indicating one example of a magnetic recording medium according to the present invention.

FIG. 1 shows a cross section in part of a pattern diagram of a magnetic recording medium having a magnetic recording layer 1030, in which first magnetic substance cells 1031 are used in a data signal storage region 1035 and second magnetic substance cells 1034 are used in a tracking servo signal storage region 1036. The first magnetic substance cells 1031 are isolated by nonmagnetic substances 1037 from one another, and the second magnetic substance cells 1034 are also isolated by nonmagnetic substances 1037 from one another.

The first magnetic substance cells 1031 and the second magnetic substance cells 1034 have different magnetic properties.

Magnetic properties refer to coercive force, residual magnetization, magnetic anisotropy and saturation magnetization, for example. It is desirable for the difference in the magnetic properties between the first magnetic substance cells 1031 and the second magnetic substance cells 1034 to be 10% or more, preferably 30% or more, and even more preferably 100% or more. The maximum difference may be 500% or less, for example.

Such differences in magnetic properties can be realized by having different volumes or shapes for the first and the second magnetic substance cells 1031 and 1034, or by having different types of magnetic materials placed in the first magnetic substance cells 1031 and the second magnetic substance cells 1034. More specifically, differences in magnetic properties can be realized in the following situations: (i) when the structures of the two types of cells themselves are different; (ii) when the types of magnetic materials placed in the two types of cells are different; and (iii) when both the structures of the two types of cells and the magnetic materials placed in the two types of cells are different. Structures of cells refer to a concept that includes cells' diameters, depths, shapes and volumes. If the structures of the first magnetic substance cells 1031 and the second magnetic substance cells 1034 are the same, the thickness of the recording layer comprising the magnetic substance cells 1031 and 1034 and the nonmagnetic substances 1037 can be made to be the same for the two regions.

If the magnetic properties are different between the data signal storage region 1035 and the tracking servo signal storage region 1036, there is no need to write tracking servo signals using a servo writer device after making a magnetic recording medium. To elaborate on this point, let as consider for example a situation in which the coercive force of the second magnetic substance cells 1034 (in the tracking servo signal storage region 1036) is higher than that of the first magnetic substance cells 1031 (in the data signal storage region 1035). A magnetic field is applied to the entire recording layer, and the first magnetic substance cells 1031 and the second magnetic substance cells 1034 are magnetized in one direction. After that, by applying a strong magnetic field that would invert the magnetization of only the first magnetic substance cells 1031, the magnetization direction of the first magnetic substance cells 1031 and that of the second magnetic substance cells 1034 would be opposite to each other.

With this, the conditions for positioning control of the servo writer device become moderated even if signals were to be written in the tracking servo signal storage region 1036. This is due to the fact that, even when a magnetic head is larger than the tracking servo signal storage region 1036 and causes a magnetic field generated by the magnetic head to be applied to the data signal storage region 1035 when writing signals, the direction of the magnetic moment of only the second magnetic substance cells 1034 can be made to be aligned.

Further, by separating each of the magnetic substance cells 1031 and 1034 with the nonmagnetic substances 1037, each magnetic substance cell 1031 or 1034 can be separated magnetically, which clearly defines magnetization transfer regions, which in turn reduces noise when reproducing signals.

In FIG. 1, the number of cells in the tracking servo signal storage region 1036 is two, but this is only one example. A configuration shown in FIG. 2 is also possible, for example.

Next, the configuration of a magnetic recording medium in accordance with an embodiment of the present invention will be described with reference to the accompanying drawings.

Figure 2:
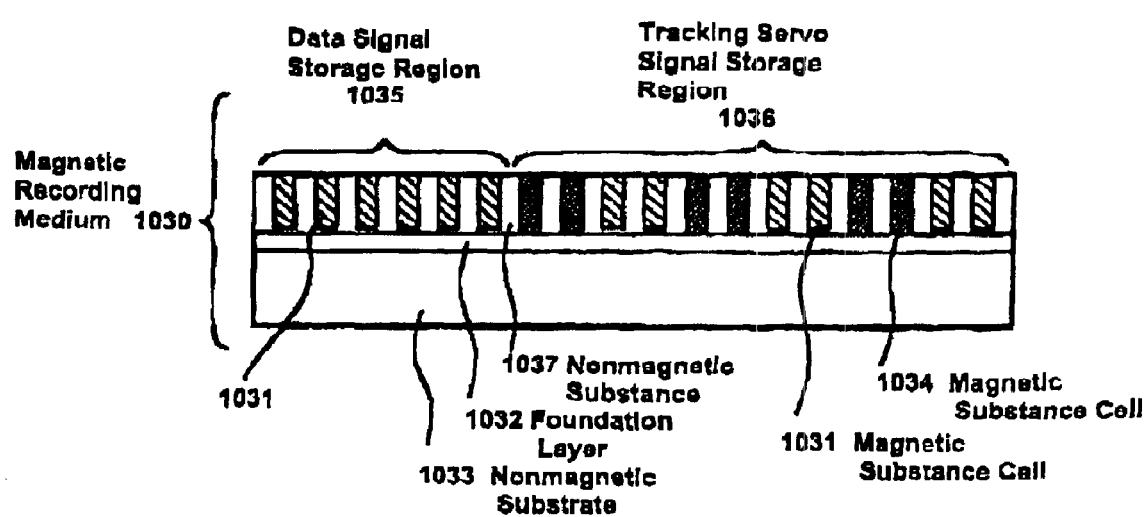
FIG. 2 shows a cross-sectional view indicating one example of a magnetic recording medium according to the present invention.

FIG. 2 is a cross-sectional view of a configuration example of a magnetic recording medium in accordance with an embodiment of the present invention. Components in this embodiment similar to those of the embodiment shown in FIG. 1 are indicated by the same reference numbers.

The magnetic recording medium in FIG. 2 has data signal storage regions each comprising a plurality of minimum unit magnetic recording sections arranged and tracking servo signal storage regions each comprising a plurality of minimum unit magnetic recording sections arranged. Magnetic substance cells that constitute a part or all of the minimum unit magnetic recording sections arranged in the tracking servo signal storage regions have different magnetic properties from those of the magnetic substance cells of the minimum unit magnetic recording sections arranged in the data signal storage regions. The minimum unit magnetic recording section refers to a part, for example, that is in charge of recording one bit.

The magnetic recording medium 1030 in FIG. 2 has a foundation layer 1032 formed on top of a nonmagnetic substrate 1033. A data signal storage region 1035 comprises first magnetic substance cells 1031, while a tracking servo signal storage region 1036 comprises a combination of the first magnetic substance cells 1031 and second magnetic substance cells 1034.

Each of the cells is separated from each other by nonmagnetic substances 1037, and the first magnetic substance cells 1031 and the second magnetic substance cells 1034 have different magnetic properties.

By separating the magnetic substance cells 1031 and 1034 by the nonmagnetic substances 1037, each of the magnetic substance cells 1031 and 1034 is magnetically isolated from each other, which allows a magnetization transfer region to be clearly defined. As a result, noise can be reduced when reproducing signals. The foundation layer 1032 is not mandatory.

Figure 3:
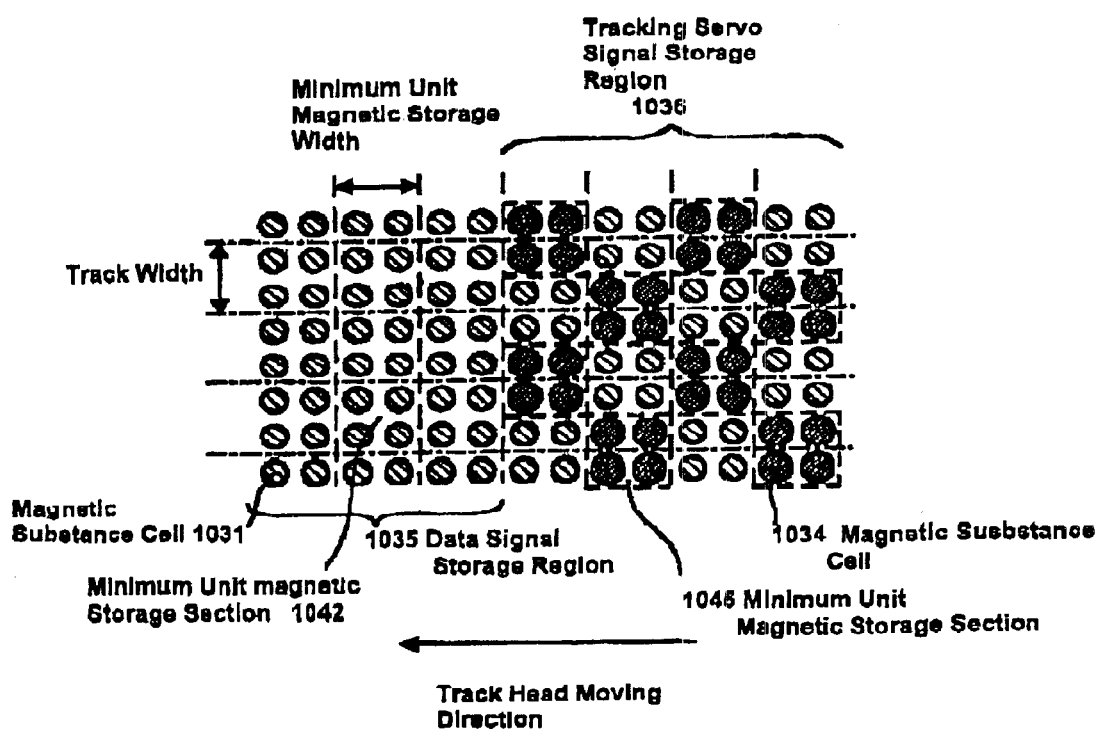
FIG. 3 shows a drawing indicating one part of a configuration example of a magnetic recording medium according to the present invention.

FIG. 3 shows a plan view of a configuration example of the magnetic recording medium according to the present invention.

Each track comprises data signal storage regions 1035 and tracking servo signal storage regions 1036 as in normal magnetic recording media, and first magnetic substance cells 1031, which are within each minimum unit magnetic recording section 1042 that constitutes the data signal storage regions 1035, comprise magnetic substances having the same magnetic properties.

On the other hand, second magnetic substance cells 1034, which are within each minimum unit magnetic recording section 1045 that partly constitutes the tracking servo signal storage regions 1036, comprise a magnetic substance material having magnetic properties different from those of the data signal storage region 1035, as shown in FIG. 3.

The minimum unit magnetic recording sections 1045, whose magnetic properties are different from those of the data signal storage regions 1035, in the tracking servo signal storage regions 1036 can be arranged staggered to straddle two adjacent recording tracks as shown in FIG. 3, or they can be arranged in such a way that their phase is different from that of the signals in the data signal storage regions 1035.

How the minimum unit magnetic recording sections 1045 are arranged depends on the tracking method and is not limited in any particular way.

The magnetic substance cells 1034 and 1031 within the minimum unit magnetic recording sections 1045 and 1042, respectively, can be plural as in FIG. 3 or singular. Further, the shape of the minimum unit magnetic recording sections 1045 or 1042 can be a square as in FIG. 3, or rectangular or circular; their shapes are not limited in any particular way. However, if their shapes are square or rectangular, it is desirable for the length of each side of the square or rectangle to be approximately 5–200 nm.

Further, although the magnetic substance cells 1034 and 1031 are arranged regularly in the present configuration example, they do not have to be arranged regularly. Alternatively, only some of the magnetic substance cells 1034 and 1031 may be arranged regularly.

The second magnetic substance cells 1034 within the minimum unit magnetic recording sections 1045 that partly constitute the tracking servo signal storage regions 1036 in FIG. 3 may preferably consist of a material whose coercive force is higher than that of the magnetic substance cells 1031 within the minimum unit magnetic recording sections 1042 that constitute the data signal storage regions 1035.

Methods to vary the coercive force of the magnetic substance cells 1031 and of the magnetic substance cells 1034 include a method to vary the volumes of the magnetic substance cells 1031 and 1034 and a method to vary their magnetic substance materials. Instead of varying their coercive forces, another way to distinguish tracking servo signals and data signals from one another is to vary the easy axis of magnetization between the magnetic substance cells 1031 and 1034, e.g., using a perpendicular magnetic recording material as a material for magnetic substance cells that constitute the data signal storage regions 1035 and using a longitudinal magnetic recording material as a material for magnetic substance cells that constitute the tracking servo signal storage regions 1036. In other words, difference in various magnetic properties (coercive force, residual magnetization, magnetic anisotropy, etc.) of the magnetic substance cells can be used as tracking servo signals.

It is desirable for the difference in the magnetic properties between the first magnetic substance cells 1031 and the second magnetic substance cells 1034 to be 10% or more, preferably 30% or more, and even more preferably 100% or more. The maximum difference is 500% or less, for example.

In addition, the magnetic recording medium according to the present invention may have a plurality of magnetic substance cells that comprise each minimum unit magnetic recording section as shown in FIG. 3, or it may have a single magnetic substance cell that constitutes each minimum unit magnetic recording section. If each minimum unit magnetic recording section comprises a single magnetic substance cell, the magnetic recording medium obtained would be a so-called patterned medium.

In the magnetic recording medium according to the present invention, the magnetic properties of at least part of the magnetic substance cells that constitute the minimum unit magnetic recording sections arranged in the tracking servo signal storage regions 1036 are different from those of the magnetic substance cells arranged in the data signal storage regions 1035. Of course, the magnetic properties of all magnetic substance cells arranged in the tracking servo signal storage regions 1036 may be different from those of the magnetic substance cells arranged in the data signal storage regions 1035.

(Difference in Materials)

Magnetic properties may be varied by varying the types of magnetic materials filled in the cells, for example, as described above.

By varying the materials of the two types of magnetic substance cells, the magnetic properties of the tracking servo signal storage regions can be freely and significantly changed; consequently, the difference in the reproduced signals in the tracking servo signal storage regions and in the data signal storage regions become clearly defined.

It is noted that the material to fill the first and second magnetic substance cells may be appropriately selected from, for example, Co, CoCr, FePt, CoPt, Co/Pd (a multiple-layer of Co and Pd), or CoCr alloy.

In particular, Co or CoCr may preferably be used as a material to fill the magnetic substance cells in the data signal storage regions, and a material that is selected from FePt, CoPt, Co/Pd (a multiple-layer of Co and Pd), or CoCr alloy may preferably be used as a material to fill the magnetic substance cells in the tracking servo signal storage regions. By selecting the materials for the respective storage regions in a manner described above, the coercive force of the magnetic substance cells in the tracking servo signal storage regions can be made higher than the coercive force of the magnetic substance cells in the data signal storage regions.

(Difference in Volume)

Alternatively, different magnetic properties may be realized by having different volumes for a part or all of the magnetic substance cells that constitute the minimum unit magnetic recording sections arranged in the tracking servo signal storage regions and for the magnetic substance cells that constitute the minimum unit magnetic recording sections arranged in the data signal storage region.

The magnetic properties of the minimum unit magnetic recording sections in which are recorded tracking servo signals can be significantly changed through the following methods. For example, if the magnetic substance cells are formed using the same magnetic material, a coercive force perpendicular to the substrate can be increased by configuring the magnetic substance cells to have large aspect ratio.

Furthermore, the coercive force of a part or all of the magnetic substance cells that constitute the minimum unit magnetic recording sections arranged in the tracking servo signal storage region may be higher than that of the magnetic substance cells that constitute the minimum unit magnetic recording sections arranged in the data signal storage region.

With such a configuration, the intensity of a direct current magnetic field can be changed, which makes it possible to form magnetic domains that are in opposite directions within each tracking servo signal storage region.

(Nonmagnetic Substances to Separate Cells)

In another preferred embodiment, the nonmagnetic substances that separate the magnetic substance cells from one another may comprise a layer whose main component is anodized aluminum.

By packing magnetic materials in fine pores that are formed by anodizing a layer, (e.g., an aluminum film) whose main component is aluminum, formed on top of a foundation layer, a recording medium in which magnetic substance cells are separated by nonmagnetic substances can be provided.

Further, in addition to anodized aluminum ($AlO_x$), oxides whose main component is silicon oxide ($SiO_x$), other oxides such as titanium oxide ($TiO_x$), magnesium oxide ($MgO_x$), tantalum oxide ($TaO_x$) and zinc oxide ($ZnO_x$), or nitrides such as AlN and $SiN_x$, or organic matter can be used as a nonmagnetic material to separate adjacent magnetic substance cells.

(Magnetic Material for Packing)

It is desirable for perpendicular magnetic recording materials that magnetize perpendicular to the substrate to be used as magnetic materials inside the magnetic substance cells, but planar magnetic recording materials that magnetize parallel to the substrate may also be used.

A nonmagnetic substrate may be a normal magnetic disk substrate, such as a glass substrate, an aluminum substrate, a carbon substrate, a resin substrate, a silicon substrate, or a substrate with NiP coated on top of any of these.

The interval between adjacent magnetic substance cells may be in the range of a few nm to a few hundred nm, preferably about 6–200 nm. The aspect ratio, which is a ratio of a magnetic substance cell's height to its width, may preferably be about 1–20. The cross section shape of each magnetic substance cell when it is viewed from the top of the substrate may be circular, oval or rectangular. The cross section area of each magnetic substance cell when it is viewed from the top of the substrate may be in the range of a few $nm^2$ to a few tens of thousands of $nm^2$, preferably about 25–10,000 $nm^2$. If the cross section shape of each magnetic substance cell when it is viewed from the top of the substrate is circular, the diameter of the magnetic substance cell may be in the range of a few nm to a few hundred nm, preferably about 5–100 nm.

Desirable materials to constitute the magnetic substance cells are materials with large saturation magnetization Ms and large magnetic anisotropy coefficient Ku. Specifically, hard magnetic materials whose main component is Co are desirable. For example, Co alloys comprising Co and one or more elements from among Cr, Pt, Ta, Nb, Pd, B, Si, Ti, V, Ru and Rh are desirable.

(Foundation Layer)

In the magnetic recording medium 1030 according to the present invention shown in FIG. 2, the foundation layer 1032 is provided between the nonmagnetic substance substrate 1033 and the nonmagnetic substance 1037. If the magnetic recording layer comprises a perpendicular magnetic recording material, a soft magnetic substance film is desirable as a material for the foundation layer 1032. Additionally, a Cr or V alloy layer may be provided in the interface of the foundation layer 1032 and a recording layer in order to control crystallinity. Further, if the nonmagnetic material that separates adjacent magnetic substance cells is an oxide whose main component is anodized aluminum ($AlO_x$), it is desirable to insert a layer containing at least one element selected from the group consisting W, Cu, Ti, Nb, Zn, Ni, Fe, Co and precious metals as a part of the foundation layer 1032. However, the foundation layer may be omitted.

It is desirable for the layer configuration of a perpendicular magnetic recording medium to be, beginning with the recording layer side, a first layer (e.g., a layer containing at least one of Ti, Zr, Hf, Nb, Ta, Mo, W or Si), then a conductive second layer (e.g., a layer containing Cu, a precious metal, an alloy containing Cu, an alloy containing a precious metal, or a semiconductor material). The first layer has fine pores that connect to the magnetic substance cells on top of them, and it is desirable for a magnetic material to be filled in the fine pores as well.

Although not shown in the configuration example shown in FIG. 2, a protective layer such as amorphous carbon or a lubricant may be provided on the surface of the magnetic recording medium in order to protect the magnetic recording medium from its contact with a magnetic head.

Figure 4:
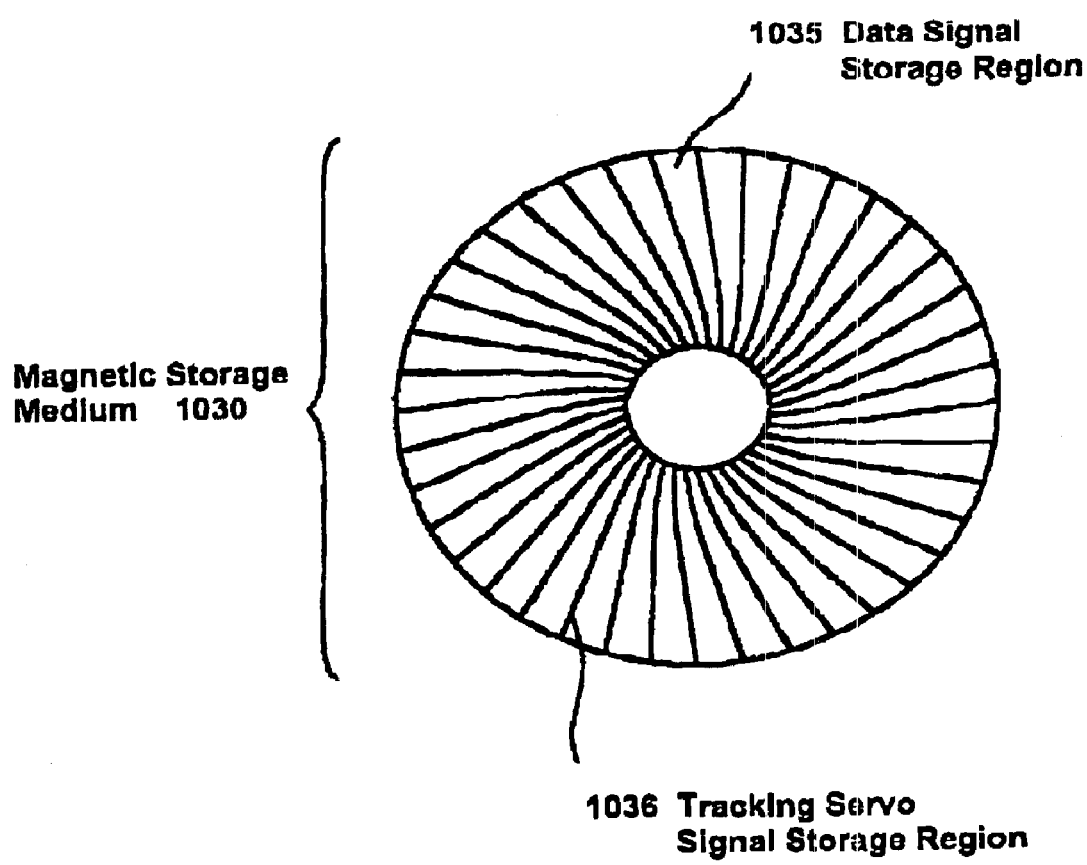
FIG. 4 shows a plan view indicating a configuration example of a magnetic recording medium according to the present invention.

FIG. 4 shows an overall plan view of the magnetic recording medium 1030 according to the present invention. As shown in FIG. 4, the data signal storage regions 1035 and the tracking servo signal storage regions 1036 are formed at a predetermined interval on the substrate of the magnetic recording medium 1030 according to the present invention. In the tracking servo signal storage regions 1036 are formed magnetic substance cells (omitted from the drawing) having magnetic properties different from those of magnetic substance cells in the data signal storage regions 1035, and tracking takes place by having a magnetic head read the magnetic substance cells in the tracking servo signal storage regions 1036. In the data signal storage regions 1035, the magnetic head records and reproduces information signals.

The tracking servo signal storage regions 1036 may in some cases contain clock regions and address code regions, in addition to the normal tracking servo signal storage regions. Although changes in the magnetic properties of the magnetic substance cells are used only for recording the tracking servo signals in the magnetic recording medium 1030 according to the present invention, their uses are not limited to this particular embodiment and needless to say they may be used as read-only magnetic recording patterns (ROM).

Second Embodiment: Manufacturing Method

Next, an example of a method for manufacturing the magnetic recording medium in accordance with an embodiment of the present invention will be described.

In this example, we will discuss a manufacturing method for a magnetic recording medium in which anodized aluminum is used as a nonmagnetic substance material that separates magnetic substance cells from each other. FIGS. 5A–5F show outlines of the manufacturing method.

Figure 5A:
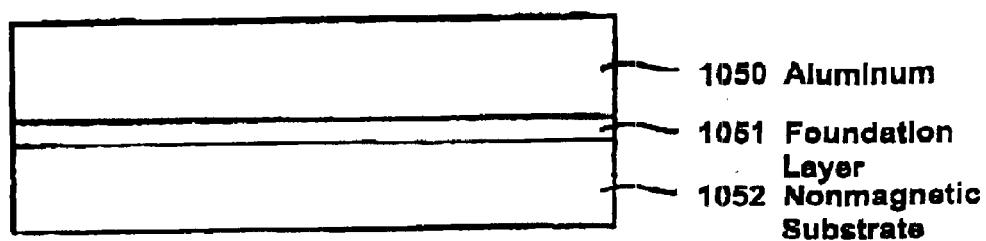
FIGS. 5A–5F show in cross section processing steps in a method for manufacturing a magnetic recording medium according to the present invention.

First, as shown in FIG. 5A, a foundation layer 1051 comprising a soft magnetic layer, an electrodeposition foundation layer, or a foundation electrode layer of Cu, is formed on top of a nonmagnetic substrate 1052 comprising glass; and a layer of an aluminum or aluminum alloy 1050, which becomes the source of nonmagnetic substance material, is formed on top of the foundation layer 1051. It is desirable to form the aluminum or aluminum alloy layer 1050, which becomes the source of the nonmagnetic substance material, and the foundation layer 1051 through a sputtering method or a vapor-deposition method.

Figure 5B:
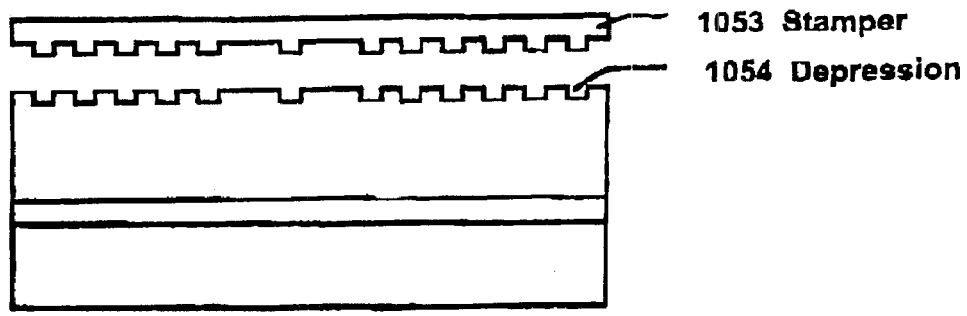

Next, as shown in FIG. 5B, a stamper 1053, on which are formed in advance convex patterns arranged regularly on a hard substrate such as SiC using electronic beam lithography that can form minute patterns, is pressed onto the surface of the aluminum or aluminum alloy layer 1050; this forms depressions 1054 on the surface of the aluminum or aluminum alloy layer 1050.

The depressions 1054 function as starting points to form pores through anodization treatment. In regions without any starting points (in flat regions), pores are formed at an interval determined by the type or concentration of electrolytic solution or by anodization voltage.

The convex patterns formed on the stamper 1053 should not form any depressions (or form depressions smaller than depressions in data signal storage regions) in places where, among magnetic substance cells in regions to write tracking servo signal information, cells having magnetic properties different from those of magnetic substance cells in data signal storage regions are formed. In at least a part of the tracking servo signal regions on the surface of film that is to be anodized, there should be depressions (second depressions) that are different from depressions (first depressions) formed in the data signal storage regions. The "depressions that are different" include depressions each of whose size is different from the first depressions and depressions whose interval between depressions is different from that of the first depressions. For example, to have different depths for the first and second depressions, there should be a difference of approximately 3 nm to 10 nm.

Figure 5C:
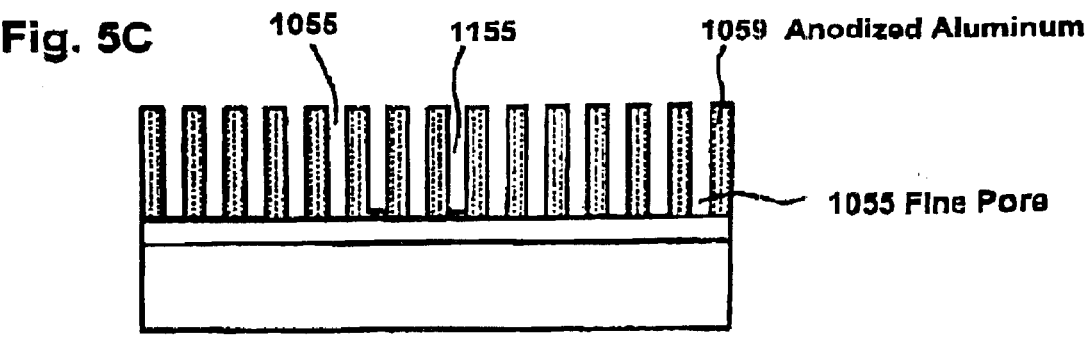

Next, anodizing treatment is performed as shown in FIG. 5C to transform the aluminum or aluminum alloy 1050 into an oxidized aluminum (anodized alumina) 1059, on which a plurality of fine pores is formed.

Anodization of aluminum is described below. In anodizing the aluminum or aluminum alloy 1050, nanohole diameters can be controlled in the range of several nm to several hundreds nm, and nanohole interval can be controlled in the range of a value slightly larger than the nanohole diameter to approximately 500 nm. Various types of acids can be used to anodize the aluminum or aluminum alloy 1050, but a sulfuric acid solution is desirable to make nanoholes with a minute interval, a phosphoric acid solution is desirable to make nanoholes with a relatively large interval, and oxalic acid is desirable to make nanoholes with an intermediate interval. The nanohole diameter can be enlarged by etching in a solution of phosphoric acid after anodization.

To make regularly arranged nanoholes, it is effective to use a method in which regularly arranged depressions 1054, which become starting points to form nanoholes, are made on the surface of the aluminum or aluminum alloy 1050.

In anodizing aluminum, places where the depressions 1054 were formed become fine pores first, while fine pores are formed more slowly in places where the depressions 1054 were not formed than in places where the depressions 1054 were formed. Consequently, the diameter and depth of the fine pores are larger in places where the depressions 1054 were formed and smaller in places where the depressions 1054 were not formed.

Under the manufacturing method described above, the sample in FIG. 5B is anodized and becomes the anodized aluminum 1059, in which fine pores are formed, as in FIG. 5C.

In FIG. 5C, reference numeral 1055 denotes fine pores (nanoholes), and the fine pores 1055 have a larger diameter and depth than fine pores 1155. The method for making such fine pores is indicated in "Forming Mosaic Structures in Anodized Porous Alumina" in Extended Abstracts (The 48th Spring Meeting 2001); The Japan Society of Applied Physics and Related Societies, No. 3, page 1332.

Figure 5D:
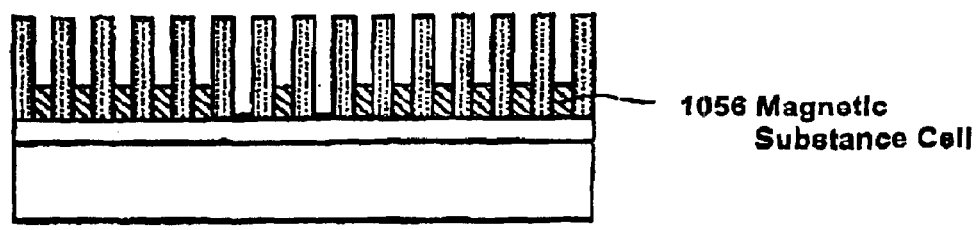

Subsequently, electrodeposition is performed to form particles of Co, which are hard magnetic particles, as shown in FIG. 5D. Since the thickness of the anodized aluminum 1059 at the bottom section of the fine pores 1155, which were formed where there were no depressions 1054 formed in advance, is thicker than that of the fine pores 1055, which were formed where there were depressions 1054 formed in advance, the voltage for electrodepositing the magnetic material is different for the two types of fine pores 1055 and 1155.

Co, which forms hard magnetic particles (first material), are electrodeposited selectively only on the fine pores 1055, which were formed where there were depressions 1054 formed in advance, using low electrodeposition potential by taking advantage of the difference in the electrodeposition voltages, and magnetic substance cells 1056 are formed.

As a method to selectively electrodeposition on fine pores, a method in which anodization is conducted after forming the depressions 1054 with the stamper 1053 is described above. Alternatively, the method to selectively electrodeposition on fine pores may be conducted by a known method for forming fine pores of different sizes with a focused ion beam and anodization.

Figure 5E:
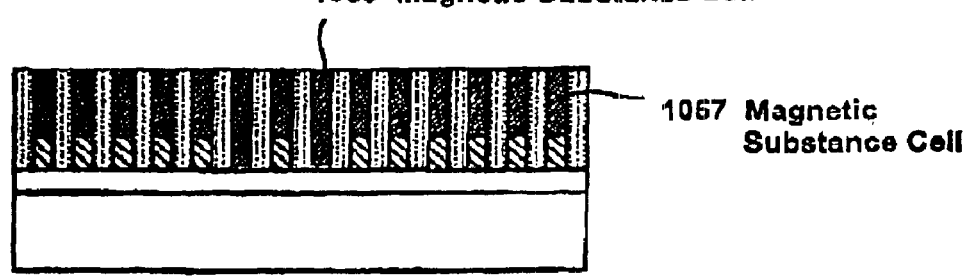

Next, by increasing the electrodeposition voltage and electrodepositing a magnetic substance material (second material) with a coercive force even higher than that of the magnetic substance material that was filled first, magnetic substance materials are filled in all of the fine pores as shown in FIG. 5E, so that every fine pore becomes either a magnetic substance cell 1057 or 1058.

By filling different materials into the two types of magnetic substance cells in the manner described above, respectively, the magnetic properties of the data signal storage regions and of the tracking servo signal storage regions can be made different from each other.

Figure 5F:
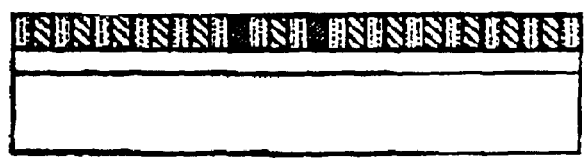

If the difference in the magnetic properties between the two types of magnetic substance cells needs be more clearly defined, the filled materials may be polished or etched to remove them to a predetermined depth, as shown in FIG. 5F. For example, the surface of the medium may be polished or etched to remove the second material and expose the first material in the data signal storage regions while leaving the second material in the tracking servo signal storage regions.

Next, the surface is planarized and amorphous carbon is formed on the surface of the medium as a protective layer (omitted from drawings) by a plasma CVD method.

Figure 6A:
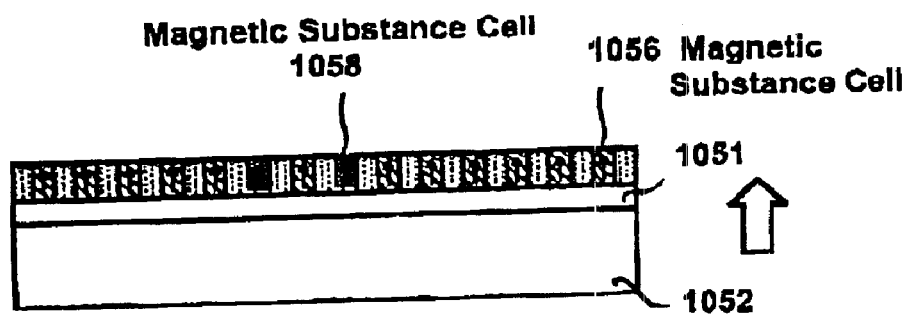
FIGS. 6A and 6B show in cross section processing steps in an example of a method for manufacturing a magnetic recording medium according to the present invention.
Figure 6B:

Next, after applying a strong DC magnetic field to magnetize all of the magnetic substance cells 1058 and 1056 in one direction as shown in FIG. 6A, only the magnetic substance cells 1056, whose magnetic material has a weaker coercive force, are magnetized as shown in FIG. 6B in the opposite direction with a weaker magnetic field than in FIG. 6A; this completes the magnetic recording medium according to the present invention.

The manufacturing method described above is characterized by having a different depth for fine pores in at least a part of the cells (second magnetic substance cells) in the tracking servo signal storage regions than the depth of the fine pores in the cells (first magnetic substance cells) in the data signal storage regions.

The magnetic recording medium according to the present invention can be realized by a method involving different pore diameters for the first and second magnetic substance cells, or a method involving different metallic layers used as the foundation layers at the bottom of the first and second magnetic substance cells, in addition to the method described above.

Pore diameters can be controlled through the positioning and depth of the fine pore starting points, as described earlier. Additionally, after forming fine pores of uniform size, only the fine pores in a predetermined area can be enlarged to control the pore diameters.

By using different metallic layers as the foundation layers at the bottom of the first and second magnetic substance cells, the electrodeposition voltage that is applied when magnetic materials are filled into the cells can be varied, so that different packing materials may be used even if the sizes of the first and second magnetic substance cells are the same.

First Embodiment Example

The present embodiment relates to a magnetic recording medium in which the volume of magnetic substance cells that constitute a part of minimum unit magnetic recording sections arranged in tracking servo signal storage regions is different from the volume of magnetic substance cells that constitute minimum unit magnetic recording sections arranged in data signal storage regions.

FIGS. 7A–7F indicates summary processing steps in a manufacturing method in accordance with the present embodiment.

Figure 7A:
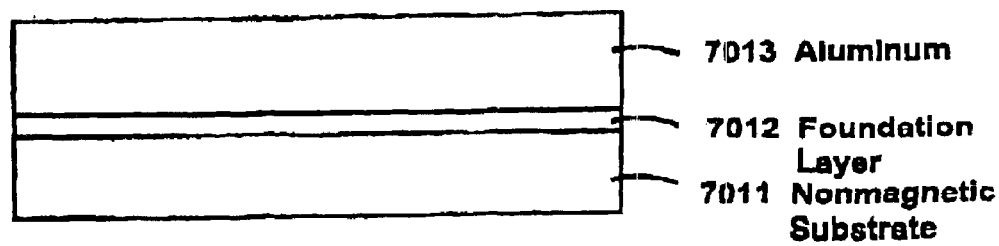
FIGS. 7A–7F show in cross section processing steps in an example of a manufacturing method for a magnetic recording medium according to the present invention.

First, on top of a silicon substrate that constitutes a nonmagnetic substrate 7011, Ti having a thickness of about 10 nm and Cu having a thickness of about 20 nm, which constitute a foundation layer 7012, were sputter-deposited by a sputtering method. Next, an aluminum film 7013 was formed through a sputtering method to a thickness of about 150 nm (FIG. 7A).

Figure 7B:
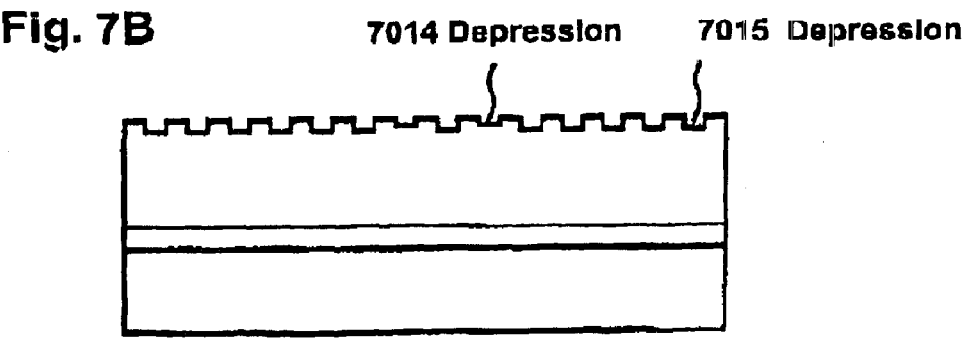

Next, a focused ion beam was irradiated on the surface of the aluminum film 7013 at a regular interval to form depressions 7014 and 7015 on the surface of the aluminum film 7013. In this case, the ion beam diameter was 30 nm and ion current was 3 pA. The staying time of the focused ion beam was 30 msec in the data signal storage regions and a part of the tracking servo signal storage regions, and 30 msec in the rest of the tracking servo signal storage regions (FIG. 7B).

As a result, large depressions 7015 were formed on the surface of the aluminum film 7013 in the tracking servo signal storage regions where the staying time of the focused ion beam was 10 msec, while smaller depressions 7014 were formed on the surface of the aluminum film 7013 in the data signal storage regions and the rest of the tracking servo signal storage regions. In this case, the interval between adjacent depressions 7015 in the data signal storage regions was 100 nm, and each minimum unit magnetic recording section comprised a single magnetic substance cell. The areal recording density of the magnetic recording medium thus created was equivalent to 65 Gbits/in$^2$ (10 Gbits/cm$^2$).

Figure 7C:
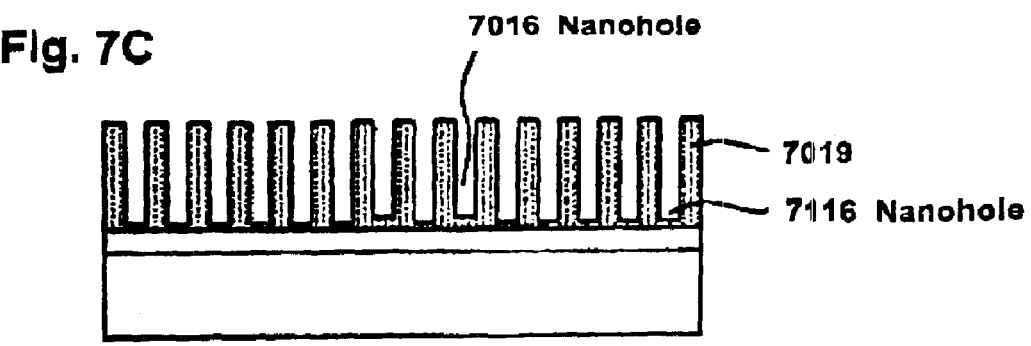

Next, the surface of the aluminum film 7013 was anodized by applying a voltage of 40V in an oxalic acid aqueous solution (concentration 0.3 mol/l) at 16° C. The interval between adjacent Alumina nanoholes 7116 and 7016 that were anodized under these conditions was 100 nm (FIG. 7C). Next, although omitted from drawings, the magnetic recording medium was immersed in a phosphoric acid aqueous solution (concentration 5 wt. %) at 25° C. for 40 minutes to enlarge the pore diameters. As a result, the volume of the nanoholes 7116, which were formed where the larger depressions 7015 were formed, became larger than the volume of the nanoholes 7016, which were formed where the smaller depressions 7014 were formed, due to greater anodization in the nanoholes 7116.

The average diameter of the Alumina nanoholes 7116 was approximately 70 nm.

Figure 7D:
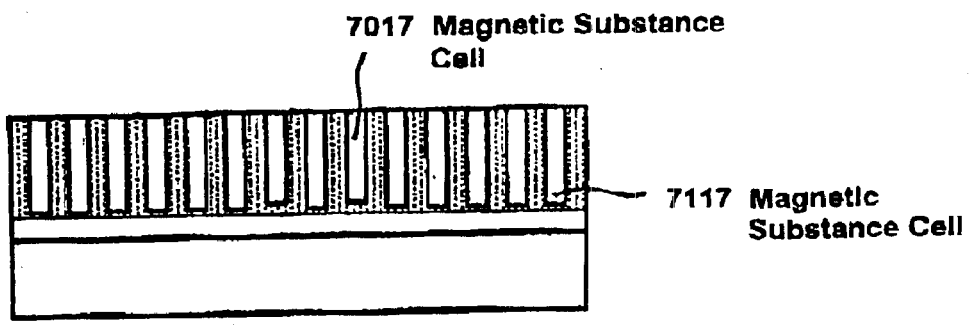

Next, Co, which is a ferromagnetic substance, was filled in all of the anodized Alumina nanoholes 7116 and 7016 thus made, and magnetic substance cells 7117 with large magnetic substance volume and magnetic substance cells 7017 with small magnetic substance volume were formed (FIG. 7D).

In this case, an aqueous solution of cobalt (II) sulfate heptahydrate (concentration 0.2 mol/l) and boric acid (concentration 0.3 mol/l) at 24° C. was used in the electrodeposition of Co. Ag/AgCl was used as a reference electrode in the solution and electrodeposition was performed at −5.0V. Next, electrodeposits that overflowed on the surface of the sample were polished and removed with ¼ $\mu$m diamond slurry. The root-mean-square (rms) of the surface at this point was 1 nm or less.

When the coercive force of the magnetic substance cells 7117 with large magnetic substance volume was measured with a vibrating sample magnetometer (VSM), the coercive force in the perpendicular direction to the substrate was 1000 (Oe), while the coercive force in the perpendicular direction of the magnetic substance cells 7017 with small magnetic substance volume was 1800 (Oe).

Figure 7E:
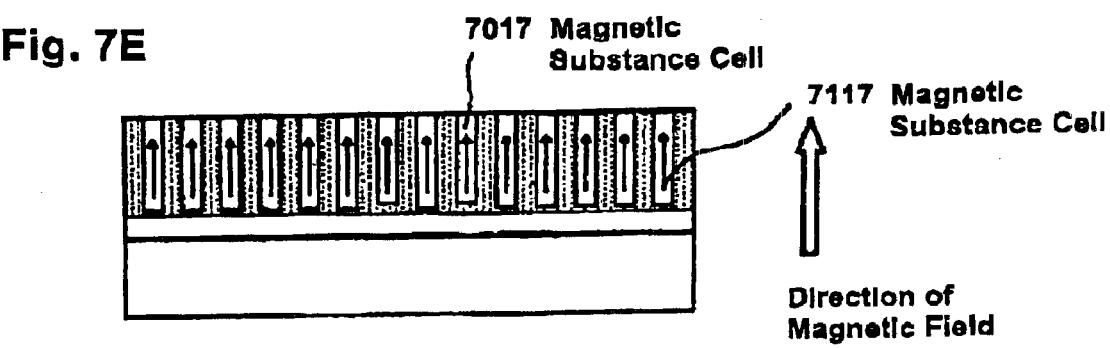
Figure 7F:
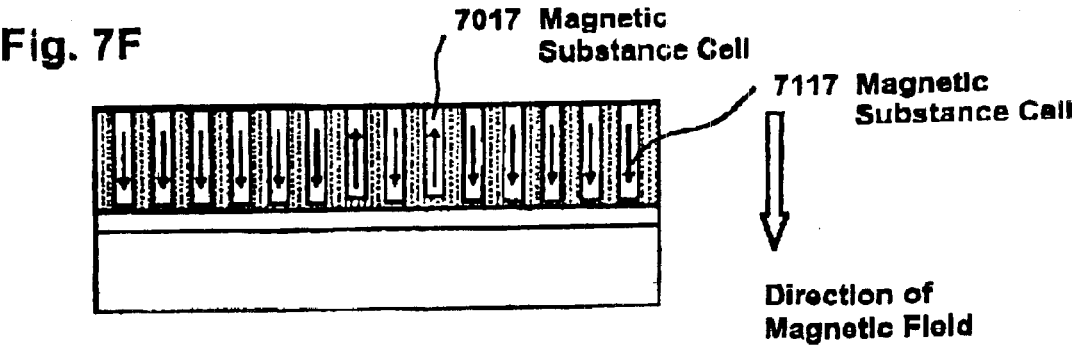

After magnetizing all of the magnetic substance cells 7117 and 7017 in one direction as shown in FIG. 7E on the magnetic recording medium thus made, a magnetic field was applied to the tracking servo signal storage regions in order to magnetize in the opposite direction the magnetic substance cells 7117 with large magnetic substance volume (magnetic substance cells with a small coercive force).

Upon observing the magnetic recording medium thus obtained on a magnetic force microscope, it was confirmed that no inversion had taken place on the magnetic substance cells 7017 with small fine pore volume, due to their high coercive force. Further, when magnetization transfer regions of magnetization inversion sections within the tracking servo signal storage regions were observed on the magnetic force microscope, there was a clear difference compared to the magnetic substance cells not separated by nonmagnetic substances.

Next, when tracking servo signals were read using a magnetic recording head, the SIN ratio of read signals was 15% higher than when the magnetic substance cells were not separated by nonmagnetic substances.

Figure 8:
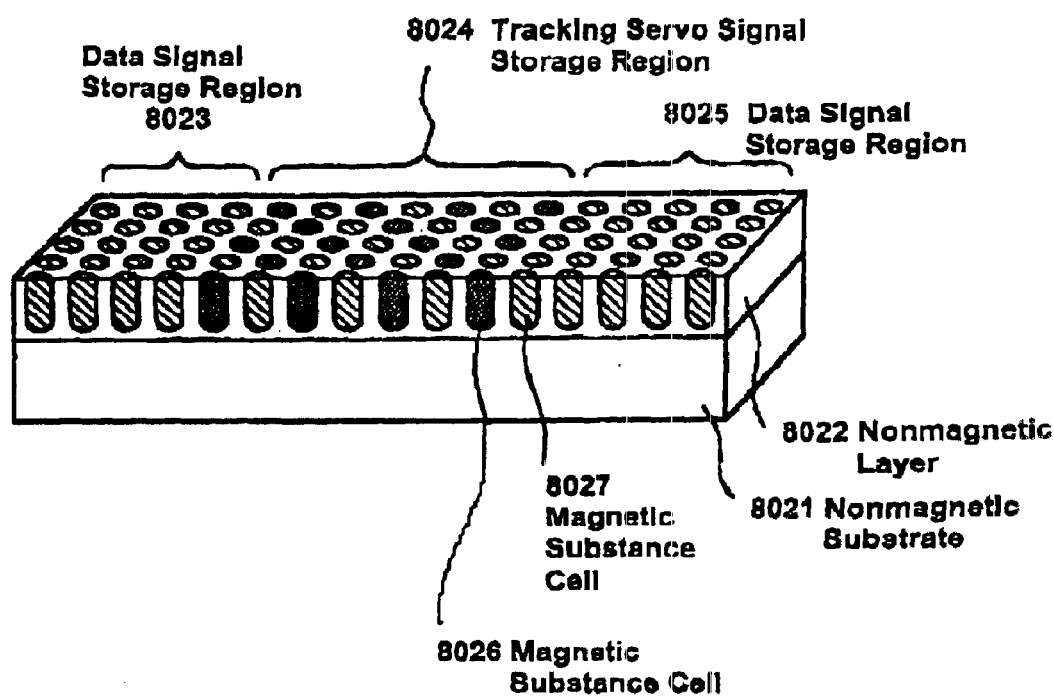
FIG. 8 shows one part of a configuration example of a magnetic recording medium according to the present invention.

FIG. 8 indicates an example of servo pattern arrangement in the present embodiment.

As shown in FIG. 8, immediately after a recording medium was made, the magnetization of magnetic substance cells 8026, which constitute a part of a tracking servo signal storage region 8024, was an inversion of the magnetization direction of other magnetic substance cells 8027, and the inverted magnetic substance cells 8026 were arranged staggered to straddle over two adjacent recording tracks. Regions 8023 and 8025 represent data signal storage regions, respectively.

Although the magnetization direction of the magnetic substances is perpendicular to the substrate in the present embodiment, the magnetization direction is not limited to this particular direction, and similar effects may be obtained when the magnetic substances are magnetized in the direction parallel to the substrate.

Second Embodiment Example

FIG. 2 shows a cross-sectional view of a second embodiment example of a magnetic recording medium according to the present invention. Components of this example similar to those of the first embodiment example may be indicated by the same reference numbers.

A magnetic recording medium 1030 according to the present embodiment comprises, similarly to the first embodiment example, a silicon substrate that constitutes a nonmagnetic substrate 1033, and on top of it Ti and Cu that constitute a foundation layer 1032, and magnetic substance cells 1031 and 1034 separated by anodized aluminum that constitutes a nonmagnetic substance 1037.

The magnetic substance cells 1034 and the magnetic substance cells 1031 have different magnetic substance volumes. Reference numeral 1035 denotes a data signal storage region, while reference numeral 1036 denotes a tracking servo signal storage region, and magnetic material within the magnetic substance cells 1031 and 1034 is Co.

FIG. 3 indicates a plan view in part of the magnetic recording medium according to the present embodiment example. In the first embodiment example, each minimum unit magnetic recording section comprised a single magnetic substance cell, but in the second embodiment example, a total of four magnetic substance cells 1034 and/or 1031 (two magnetic substance cells in a track width direction and two magnetic substance cells in a direction perpendicular to the first) constitutes each minimum unit magnetic recording section 1042 and 1045.

The method for making the magnetic recording medium is omitted since it is the same as the one for the first embodiment.

However, in the magnetic recording medium in the second embodiment example, the center-to-center distance of adjacent nanoholes was 50 nm, the average pore diameter was 40 nm, and the areal recording density of the magnetic recording medium thus made was equivalent to 65 Gbits/in$^2$ (10 Gbits/cm$^2$).

As shown in FIG. 3, each track comprises the data signal storage regions 1035 and the tracking servo signal storage regions 1036 as in normal magnetic recording media, and the magnetic substance cells 1031 within each minimum unit magnetic recording section 1042 that constitutes the data signal storage regions 1035 comprise a magnetic substance with the same magnetic substance volume.

On the other hand, the magnetic substance cells 1034 within each minimum unit magnetic recording section 1045 that partly constitutes the tracking servo signal storage regions 1036 have magnetic substance volume that is different from that of the magnetic substance cells 1031 in the data signal storage regions 1035.

The minimum unit magnetic recording sections 1045, which comprise the magnetic substance cells 1034 with magnetic substance volume different from that of the magnetic substance cells 1031, are arranged staggered to straddle two adjacent recording tracks, as in the first embodiment example.

The magnetic recording medium 1030 thus made yielded generally the same effects as the first embodiment example.

Although the number of magnetic substance cells that constitute each minimum unit magnetic recording section is four in the second embodiment example, the number is not limited to this and may be one or more, preferably two or more.

Third Embodiment Example

The present embodiment relates to a magnetic recording medium in which the material of magnetic substance cells that constitute a part of minimum unit magnetic recording sections arranged in tracking servo signal storage regions is different from the material of magnetic substance cells that constitute minimum unit magnetic recording sections arranged in data signal storage regions.

FIG. 5 indicates summary process steps in a manufacturing method in accordance with a third embodiment example.

First, on top of a silicon substrate that constitutes a nonmagnetic substrate 1052, Ti having a thickness of about 10 nm and Cu having a thickness of about 20 nm, which constitute a foundation layer 1051, were sputter-deposited in a sputtering method. Next, an aluminum film 1050 was formed by a sputtering method to a thickness of about 150 nm (FIG. 5A).

Next, a stamper 1053, which has protrusions made by electronic beam lithography and arranged regularly on a SiC substrate, is pressed onto the surface of the aluminum film 1050, where the protrusions correspond to the data signal storage regions and to a part of the tracking servo signal storage regions (FIG. 5B).

As a result, depressions 1054 at a constant interval were formed on the surface of the aluminum film 1050 in the data signal storage regions and a part of the tracking servo signal storage regions.

In this case, the interval between adjacent depressions 1054 in the data signal storage regions was about 100 nm, and each minimum unit magnetic recording section comprised a single magnetic substance cell. The areal recording density of the magnetic recording medium thus created was equivalent to 65 Gbits/in$^2$ (10 Gbits/cm$^2$). Next, the Al surface was anodized by applying a voltage of 40V in an oxalic acid aqueous solution (concentration 0.3 mol/l) at 16° C. to form anodized Alumina nanoholes 1055 and 1155 (FIG. 5C).

The interval between adjacent Alumina nanoholes 1055 and 1155 that were anodized under these conditions was about 100 nm. Next, the magnetic recording medium was immersed in a phosphoric acid aqueous solution (concentration 5 wt. %) at 20° C. for 30 minutes to enlarge the pore diameters, and the average pore diameter of the Alumina nanoholes 1055 became approximately 80 nm. At the bottom section of the Alumina nanoholes (fine pores) 1055, which were formed where the depressions 1054 were formed in advance, Cu that is the foundation layer 1051 became exposed due to advanced anodization and the Alumina nanoholes 1055 therefore indicated favorable conductivity. On the other hand, however, at the bottom section of the Alumina nanoholes (fine pores) 1155, which were formed where no depressions 1054 were formed, had low conductivity due to residual anodized aluminum 1059. Consequently, different materials can be filled into different nanoholes by varying the electrodeposition voltage for magnetic substances that are filled in various nanoholes.

Next, Co, which is a ferromagnetic substance, was filled in some of the anodized Alumina nanoholes thus made. First, Co was filled in the Alumina nanoholes 1055, where there were depressions 1054 formed in advance, i.e., the nanoholes in the data signal storage regions and a part of the tracking servo signal storage regions, to make Co-filled magnetic substance cells 1056. In this case, an aqueous solution of cobalt (II) sulfate heptahydrate (concentration 0.2 mol/l) and boric acid (concentration 0.3 mol/l) at 24° C. was used in the electrodeposition of Co. Ag/AgCl was used as a reference electrode in the solution and electrodeposition was performed at −2.0V.

Next, a CoPt alloy, which has a higher coercive force than Co, was filled in the rest of the nanoholes, i.e., the Alumina nanoholes 1155 formed where there were no depressions 1054 formed, to make CoPt alloy-filled magnetic substance cells 1058.

In this case, a mixture of an aqueous solution of cobalt (II) sulfate heptahydrate (concentration 0.2 mol/l) and boric acid (concentration 0.3 mol/l) and platinum hexachloride hexahydrate (concentration 0.1 mol/l) at the ratio of (cobalt (II) sulfate heptahydrate+ boric acid): platinum hexachloride hexahydrate=1:1 was used at 24° C. in the electrodeposition of CoPt alloy. Ag/AgCl was used as a reference electrode in the solution and electrodeposition was performed at −5.0V. Next, electrodeposits that overflowed on the surface of the sample were polished and removed with ¼ $\mu$m diamond slurry. The root-mean-square of the surface at this point was 1 nm or less.

When the coercive force of the magnetic substance cells 1056 filled with Co was measured with a vibrating sample magnetometer (VSM), the coercive force was 1800 (Oe), while the coercive force of the magnetic substance cells 1058 filled with a CoPt alloy was 2500 (Oe).

Next, the magnetic recording medium that was made as described in FIG. 5 was magnetized using the method shown in FIG. 6.

First, after magnetizing all of the magnetic substance cells 1056 and 1058 in one direction, a magnetic field was applied to all regions in order to magnetize in the opposite direction the magnetic substance cells 1056 filled with Co, which has a low coercive force.

Upon observing the magnetic recording medium thus made on a magnetic force microscope, it was confirmed that no inversion had taken place on the magnetic substance cells 1058 filled with a CoPt alloy, which has a high coercive force. Further, when magnetization transfer in magnetization inversion regions was observed on the magnetic force microscope, there was a clear difference compared to the magnetic substance cells not separated by nonmagnetic substances.

Next, when tracking servo signals were read using a magnetic recording head, the S/N ratio of read signals was maintained at a higher level than when the magnetic substance cells are not separated by nonmagnetic substances, and the S/N ratio of read signals had increased by approximately 20% using the method that varies the magnetic substance materials compared to the method that varies only the depths of the magnetic substance cells, i.e., the method that varies only the thickness of the magnetic layer.

An example of a servo pattern arrangement in the present embodiment is as shown in FIG. 8. As shown in FIG. 8, the magnetization of a part of a tracking servo signal storage region is inverted, and the inverted regions are arranged staggered to straddle over two adjacent recording tracks.

Fourth Embodiment Example

Figure 9:
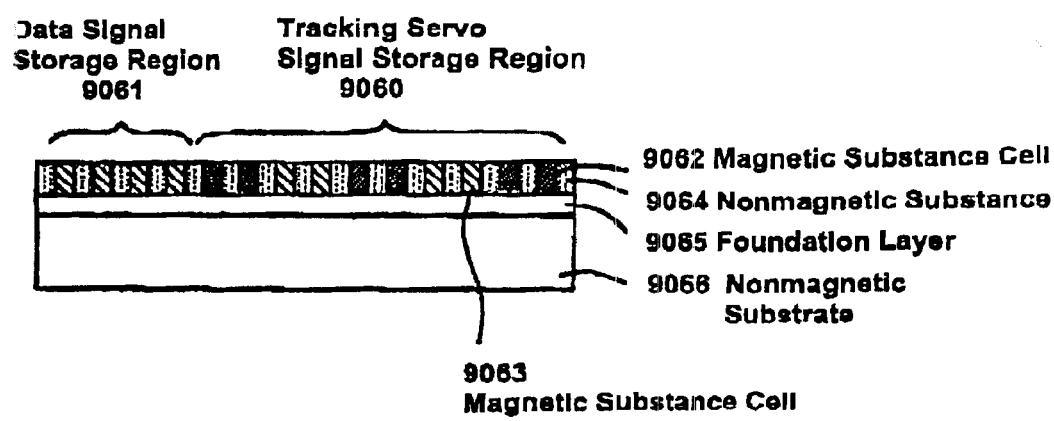
FIG. 9 shows one part of a configuration example of a magnetic recording medium according to the present invention.

FIG. 9 is a cross-sectional view of a magnetic recording medium in accordance with a fourth embodiment example of the present invention.

In the third embodiment example, each minimum unit magnetic recording section comprises a single magnetic substance cell, but four magnetic substance cells constitute each minimum unit magnetic recording section in the fourth embodiment example. In FIG. 9, reference numeral 9061 denotes a data signal storage region; reference numeral 9060 denotes a tracking servo signal storage region; reference numerals 9062 and 9063 denote magnetic substance cells; reference numeral 9064 denotes anodized aluminum that constitutes a nonmagnetic substance; reference numeral 9065 denotes Ti and Cu that constitute a foundation layer; and reference numeral 9066 denotes silicon that constitutes a nonmagnetic substrate.

The magnetic substance cells 9063 and the magnetic substance cells 9062 have different magnetic materials. For example, the magnetic material within the magnetic substance cells 9062 is a CoPt alloy, while the magnetic material within the magnetic substance cells 9063 is Co.

With such a configuration, the coercive force of the magnetic substance cells 9062 and of the magnetic substance cells 9063 in the direction perpendicular to the substrate are different from each other. Specifically, when the coercive force of the magnetic substance cells 9063 filled with Co was measured on a vibrating sample magnetometer (VSM), the coercive force was found to be 1800 (Oe), while the coercive force of the magnetic substance cells 9062 filled with a CoPt alloy was found to be 2500 (Oe).

The method for making the fourth embodiment example is omitted since it is virtually the same as the method used in the third embodiment example. In the magnetic recording medium according to the present embodiment, the center-to-center distance of adjacent nanoholes was about 50 nm and four nanoholes constituted each minimum unit magnetic recording section. The surface recording density of the magnetic recording medium thus made was equivalent to 65 Gbits/in$^2$ (10 Gbits/cm$^2$).

An example of servo pattern arrangement in the present embodiment is as shown in FIG. 3. As shown in FIG. 3, immediately after the recording medium was made, magnetic substance cells 1034 within each minimum unit magnetic recording section 1045 that constitutes part of the tracking servo signal storage region 1036 were magnetized in the opposite direction to the magnetic substance cells 1031 within the data signal storage region 1035, and the minimum unit magnetic recording sections 1045 were arranged staggered to straddle two adjacent recording tracks. In addition, each of the minimum unit magnetic recording sections 1042 within the data signal storage region 1035 comprised four magnetic substance cells 1031. Further, in this case, the magnetization direction of the magnetic substance cells 1031 and of the magnetic substance cells 1034 was opposite to each other.

The magnetic recording medium thus made yielded virtually same effects as the third embodiment.

Although the number of magnetic substance cells that constitute each minimum unit magnetic recording section is four in the present embodiment, the number is not limited to this and should be one or more, preferably two or As described above, magnetic recording media, in which the magnetic properties of cells in data signal storage regions and the magnetic properties of at least part of the cells in tracking servo signal storage regions are different, can be provided according to the present invention.

What is claimed is:

1. A magnetic recording medium comprising:
   at least one data signal storage region having first magnetic substance cells; and
   at least one tracking servo signal storage region having second magnetic substance cells, wherein the first magnetic substance cells are separated from one another by nonmagnetic substance and the second magnetic substance cells are separated from one another by nonmagnetic substance, and wherein the first magnetic substance cells and the second magnetic substance cells have different magnetic properties and the first magnetic substance cells are composed of magnetic material that is different from magnetic material composing the second magnetic substance cells.

2. A magnetic recording medium according to claim 1, wherein each of the first magnetic substance cells and the second magnetic substance cells has a columnar configuration.

3. A magnetic recording medium according to claim 1, wherein each of the first magnetic substance cells has a cell structure that is different from a cell structure of each of the second magnetic substance cells.

4. A magnetic recording medium according to claim 1, wherein each of the first magnetic substance cells has a cell volume that is different from a cell volume of each of the second magnetic substance cells.

5. A magnetic recording medium according to claim 1, wherein each of the first magnetic substance cells has a coercive force that is different from a coercive force of each of the second magnetic substance cells.

6. A magnetic recording medium according to claim 1, wherein the tracking servo signal storage region includes the first magnetic substance cells.

7. A magnetic recording medium according to claim 1, wherein the nonmagnetic substance is anodized aluminum.

8. A magnetic recording medium according to claim 1, wherein the first magnetic substance cells and the second magnetic substance cells form a recording layer, and further comprising a first layer containing at least one of Ti, Zr, Hf, Nb, Ta, Mo, W and Si in contact with the recording layer and a second layer having a conductivity in contact with the first layer.

9. A magnetic recording medium comprising:
   an anodized aluminum layer defining data signal storage regions and tracking servo signal storage regions and having pores separated from one another in the data signal storage regions and the tracking servo signal storage regions;
   first magnetic substance cells formed from at least first magnetic substance filled in the pores; and
   second magnetic substance cells formed from second magnetic substance filled in the pores,
   wherein the first cells that are formed in the data signal storage regions and the second cells that are formed in the tracking servo signal storage regions have different magnetic properties and wherein the first magnetic substance is different from the second magnetic substance.

10. A magnetic recording medium according to claim 9, wherein each of the pores has a columnar configuration.

11. A magnetic recording medium according to claim 9, wherein each of the first magnetic substance cells has a cell structure that is different from a cell structure of each of the second magnetic substance cells.

12. A magnetic recording medium according to claim 11, wherein the first magnetic substance cells include the second magnetic substance.

13. A magnetic recording medium according to claim 9, wherein the first cell has a volume that is different from a volume of the second cell.

14. A magnetic recording medium according to claim 9, wherein the first magnetic substance has a coercive force that is different from a coercive force of the second magnetic substance.

15. A magnetic recording medium according to claim 10, wherein each of the tracking servo signal storage regions includes the first magnetic substance cells.

16. A magnetic recording medium according to claim 9, wherein the pores are magnetically isolated from one another by nonmagnetic material.

17. A magnetic recording medium according to claim 9, further comprising a first layer containing at least one of Ti, Zr, Hf, Nb, Ta, Mo, W and Si in contact with the anodized aluminum layer, and a conductive second layer in contact with the first layer.

18. A magnetic recording apparatus comprising the magnetic recording medium according to claim 1 and a signal recording head.

19. A magnetic recording medium comprising:
    at least one data signal storage region having first magnetic substance cells, and
    at least one tracking servo signal storage region having second magnetic substance cells,
    wherein the first magnetic substance cells are separated from one another by nonmagnetic substance and the second magnetic substance cells are separated from one another by nonmagnetic substance,
    wherein the first magnetic substance cells and the second magnetic substance cells have different magnetic properties,
    wherein the first magnetic substance cells and the second magnetic substance cells have a columnar configuration, and
    wherein a diameter of the columnar configuration of the first magnetic substance cells is different from a diameter of the columnar configuration of the second magnetic substance cells.

20. A magnetic recording medium according to claim 19, wherein each of the first magnetic substance cells has a coercive force that is different from a coercive force of each of the second magnetic substance cells.

21. A magnetic recording medium according to claim 19, wherein the tracking servo signal storage region includes the fist magnetic substance cells.

22. A magnetic recording medium according to claim 19, wherein the nonmagnetic substance is anodized aluminum.

23. A magnetic recording medium according to claim 19, wherein the first magnetic substance cells and the second magnetic substance cells form a recording layer, and further comprising a first layer containing at least one of Ti, Zr, Hf, Nb,Ta, Mo, W and Si in contact with the recording layer, and a second layer having a conductivity in contact with the first layer.

* * * * *

UNITED STATES PATENT AND TRADEMARK OFFICE
CERTIFICATE OF CORRECTION

PATENT NO. : 6,852,431 B2
DATED : February 8, 2005
INVENTOR(S) : Kazuhiko Fukutani et al.

It is certified that error appears in the above-identified patent and that said Letters Patent is hereby corrected as shown below:

Column 10,
Line 35, "electrodeposition" should read -- eletrodeposit --.

Column 18,
Line 16, "claim 10," should read -- claim 9, --.

Signed and Sealed this

Fifth Day of July, 2005

JON W. DUDAS
*Director of the United States Patent and Trademark Office*